United States Patent [19]

O'Connor

[11] Patent Number: 4,581,624
[45] Date of Patent: Apr. 8, 1986

[54] MICROMINIATURE SEMICONDUCTOR VALVE

[75] Inventor: James M. O'Connor, Ellicott City, Md.

[73] Assignee: Allied Corporation

[21] Appl. No.: 585,094

[22] Filed: Mar. 1, 1984

[51] Int. Cl.[4] ............... H01L 49/02; H01L 29/84; H01L 29/96; H01L 29/06
[52] U.S. Cl. ............... 357/26; 357/6; 357/55; 357/56; 137/831; 156/644
[58] Field of Search ............... 357/4, 26, 55, 56, 6; 137/825, 827, 831, 833; 251/61.1; 156/644, 647

[56] References Cited

U.S. PATENT DOCUMENTS

| | | | |
|---|---|---|---|
| 3,936,029 | 2/1976 | Brandt | 251/61.1 |
| 4,203,128 | 5/1980 | Guckel et al. | 357/60 |
| 4,293,373 | 10/1981 | Greenwood | 156/628 |

OTHER PUBLICATIONS

Terry et al., "A Gas Chromatographic Air Analyzer Fabricated on a Silicon Wafer" *IEEE Transactions on Electron Devices*, vol. ED-26, No. 12, (Dec. 1979), pp. 1880-1886.
K. E. Petersen, "Dynamic Micromechanics on Silicon: Techniques and Devices" *IEEE Transactions on Electron Devices*, vol. ED-25, No. 10, (Oct. 1978), pp. 1241-1250.
J. B. Angell et al., "Silicon Micromechanical Devices," *Scientific American*, vol. 248, (1983), pp. 44-55.

*Primary Examiner*—James J. Carroll
*Attorney, Agent, or Firm*—James R. Ignatowski; Russel C. Wells

[57] ABSTRACT

A microminiature valve having a multilayer integral structure formed on a semiconductor substrate. The valve comprises a semiconductor substrate having inlet and outlet apertures and a raised valve seat. The substrate is overlayed with a nonporous top layer and an intermediate layer. The central portion of the intermediate layer is preferentially etched away to form an enclosed chamber connecting said inlet and outlet ports. The unetched portion of said intermediate layer peripherally supports said top layer above the valve seat. An electrically conductive electrode disposed on the unsupported portion of the top layer permits it to be electrostatically deflected to engage the valve seat and close the valve.

6 Claims, 9 Drawing Figures

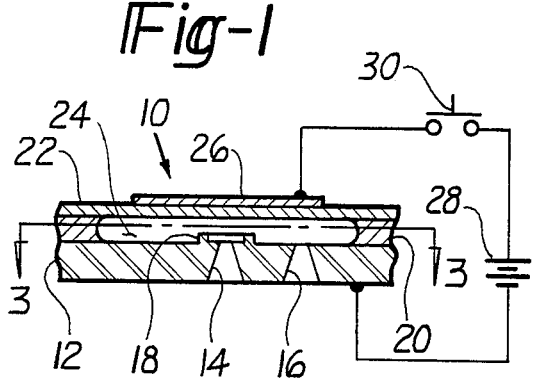
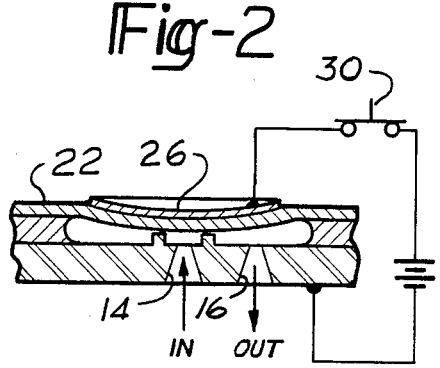
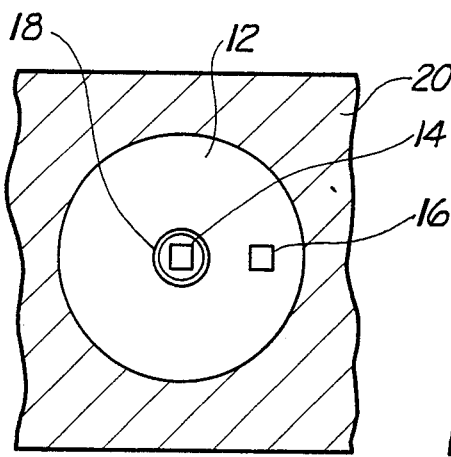
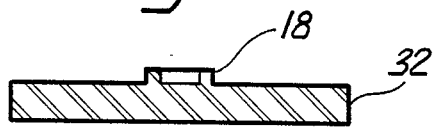
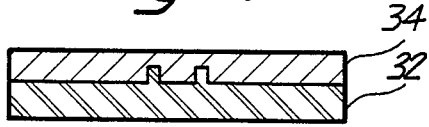
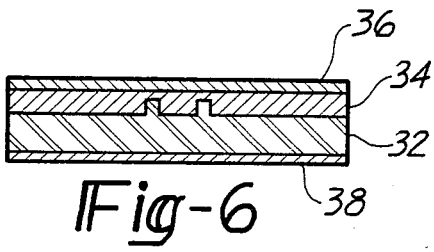
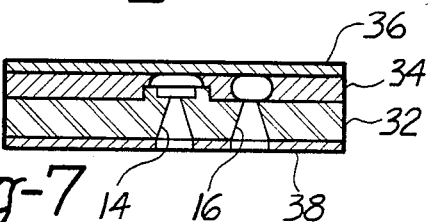
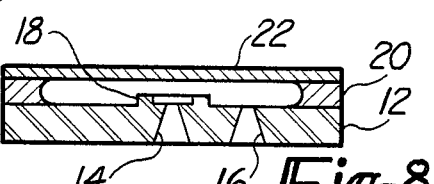
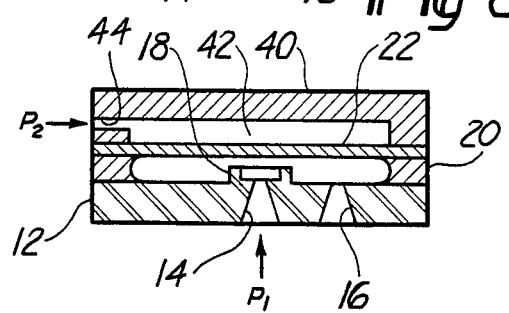

MICROMINIATURE SEMICONDUCTOR VALVE

BACKGROUND OF THE INVENTION

1. Field of the Invention

The invention is related to pneumatic valves and in particular to a microminiature valve compatible in size and materials with current integrated circuit technology.

2. Prior Art

The need for small pneumatic valves for use in conjunction with integrated circuits is exemplified by Terry et al in their publication "A Chromatographic Air Analyzer Fabricated on a Silicon Wafer" *IEEE Transactions on Electronic Devices*, Vol. ED 26, No. 12, December 1979. In this publication Terry et al discloses a miniature valve made on a silicon wafer having a nickel diaphragm actuatd by a solenoid plunger. In contrast to the metal diaphragm taught by Terry et al, Greenwood, U.S. Pat. No. 4,293,373, and Guckel et al, U.S. Pat. No. 4,203,128, disclose techniques for forming flexible diaphragms from silicon wafers by diffusing boron into the surface of the silicon wafer in the region where the flexible diaphragm is to be formed. The undoped silicon is then preferentially etched away leaving a flexible diaphragm in the boron diffused region. Guckel et al additionally discloses a two part valve using a boron doped flexible diaphragm. Alternatively, K. E. Peterson in his article "Dynamic Micromechanics on Silicon: Techniques and Devices" *IEEE Transactions on Electron Devices, Vol. ED*-25, No. 10, October 1978, discloses a method for making miniature cantilever beam devices using silicon dioxide layers on a silicon substrate. In these devices, the silicon underlying the silicon dioxide layer is etched away to form a well under the unetched silicon dioxide beam. Petersen also teaches electrostatic deflection of the cantilever beams using a metal electrode deposited over the top surface of the silicon dioxide beam. In contrast to the solenoid plunger deflection of the membrane as taught by Terry et al, Brandt in U.S. Pat. No. 3,936,029, teaches a pneumatic amplifier in which the diaphragm is disposed between an operating chamber and a signal chamber. The pressure in the signal chamber displaces the membrane which varies the fluid conduction through the operating chamber.

The invention is a multi-layered integral microminiature valve which is compatible with current silicon wafer processing technology and eliminates the nickel diaphragm and solenoid actuator in the microminiature valve taught by Terry et al.

SUMMARY OF THE INVENTION

The invention is a single piece microminiature valve compatible with existing silicon wafer processing techniques common in the electronics industry having fast response and small dead volumes. The micorminiature valve is of the type as taught by Terry et al formed on a semiconductor substrate having an inlet and outlet port passing through the substrate, a raised valve seat circumscribing the inlet port, a spacer circumscribing said inlet and outlet ports, a flexible diaphragm supported by said spacer and means responsive to an input signal for deflecting the flexible diaphragm to engage said valve seat occluding fluid flow between said inlet and outlet ports, characterized in that said microminiature valve is a multilayer integral structure comprising said semiconductor substrate having said inlet and outlet ports and said raised valve seat, a nonporous top layer and an intermediate layer preferentially etched to form an annular spacer between said substrate and said top layer, circumscribing said inlet and outlet ports and peripherally supporting said top layer above said raised valve seat, wherein the unsupported central portion of said top layer constitutes said flexible diaphragm. In the preferred embodiment a thin metal electrode is disposed over the top layer permitting the central portion thereof to be electrostatically deflected to engage the valve seat in response to an applied electrical potential.

The advantage of the microminiature valve is that it is a single piece integral structure eliminating the requirement of precise mating of multiple components. Another advantage is that the microminiature valve can be made using existing semiconductor processes. Still another advantage is that it has a low profile on the order of the thickness of a silicon wafer. A final advantage is that the valve can be made from only silicon and silicon dioxide materials eliminating possible sources of contamination.

These and other advantages will become more apparent from reading the Specification in conjunction with the drawings.

BRIEF DESCRIPTION OF THE DRAWINGS

FIG. 1 is a cross-sectional side view of the microminiature valve in the open state.

FIG. 2 is a cross-sectional side view of the microminiature valve in the closed state.

FIG. 3 is a cross-sectional top view of the microminiature valve.

FIGS. 4 through 8 are cross-sectional side views of the microminiature valve used to explain the fabrication steps for making the valve.

FIG. 9 is a cross-sectional side view of an alternate embodiment of the microminiature valve actuated by a pressure signal.

DETAILED DESCRIPTION OF THE INVENTION

The details of the microminiature valve are shown on FIGS. 1 through 3. Referring to FIGS. 1 and 3 the microminiature valve 10 is a multi-layered structure comprising a p type silicon substrate 12 having a centrally disposed inlet port 14, an offset outlet port 16 passing therethrough and a raised annular valve seat 18 circumscribing the inlet port 14 on the top or internal surface of the substrate 12. An annular spacer 20 is formed on the top surface of the substrate 12 circumscribing the inlet port 14 and outlet port 16. The spacer 20 supports a thin nonporous layer 22, such as a silicon dioxide layer, a small distance above the top of the annular valve seat 18 enclosing the volume 24 defined by the spacer 20 between the substrate 12 and layer 22. The unsupported central portion of layer 22 constitutes a flexible diaphragm. A thin conductive metal electrode 26 is provided on the top surface of layer 22.

A source of electrical power illustrated by battery 28 and switch 30 is connected between the substrate 12 and electrode 26.

In operation, when the switch 30 is open, as shown on FIG. 1, the nonporous layer 22 is supported by the spacer 20 above the top surface of the valve seat 18 providing a fluid flow path between the inlet port 14 and the outlet port 16. However closing switch 30 applies the electrical potential from the source of electrical power 28 between the substrate 12 and the electrode 26 generating an electrostatic static field therebetween. This electrostatic field generates a force deflecting the central portion of layer 22 towards the substrate as shown in FIG. 2. The potential of the source of electrical power is selected to generate an electrostatic force on layer 22 greater than the force exerted in the reverse direction by the pressure of the fluid received at the inlet port 14. Therefore when switch 30 is closed, the electrostatic force will deflect the central portion of layer 22 sufficiently to seat on annular valve seat 18 occluding the inlet port 14 and inhibiting the fluid flow between the inlet port 14 and outlet port 16. Removal of the electrical potential between the substrate 12 and electrode 22 will terminate the electrostatic force, and layer 22 will return to the position shown in FIG. 1 opening the fluid connection between the inlet and outlet ports. The opening of the valve 10 upon termination of the electrostatic field will also be assisted by the pressure of the fluid applied to the inlet port 14 enhancing the response time of the valve.

The fabrication of the microminature valve will be discussed relative to FIGS. 4 through 8. Referring first to FIG. 4, the nnular valve seat 18 is formed on the top surface of a (100) oriented p type silicon susbstrate 32 using photolithography and an isotropic silicon etchant such as HF—HNO₃. Next a thick layer 34 of n+ type silicon is deposited or grown on the top surface of the silicon wafer as shown in FIG. 5. The n+ type silicon layer 34 must be etchable by chemicals which do not attack the p type silicon substrate 32 or silicon dioxide layer 22. Preferably the n+ type silicon layer 34 is a polysilicon layer grown on the surface of the substrate 32 using any of the conventional techniques known in the semiconductor field. This layer is preferably in the range from 10 to 20 micrometers thick determined by height of the raised valve seat 18 and other operational parameters of the valve.

The top surface of the n+ type silicon layer is then polished to remove surface irregularities. Silicon dioxide layers 36 and 38, about 10 micrometers thick, are then formed on opposite sides of the coated substrate as shown in FIG. 6. The silicon dioxide layer 36 will become the flexible diaphragm of the completed valve while silicon dioxide layer 38 is patterned and used as a mask for the formation of the inlet port 14 and outlet port 16.

The inlet port 14 and outlet port 16 are then formed by an anisotropic etch through the p type silicon substrate 32 using a first etchant such as KOH-isoproponol-water stopping at the top silicon dioxide layer 36 as shown in FIG. 7. The silicon dioxide layer 38 is then removed. Finally the n+ type polysilicon layer 34 is preferentially etched to form the internal volume 24 of the valve by introducing a second etchant, such as HF—HNO₃—CH₃COOH solution through the input port 14. The second etchant will preferentially etch the n+ type polysilicon 34 layer from between the silicon substrate 32 and the silicon dioxide layer 36 forming a silicon dioxide flexible diaphragm, spacer 20, and internal volume 24 as shown in FIG. 8. The valve is completed by adding an electrically conductive metal electrode 26 over the silicon dioxide layer 36 as shown in FIG. 1. Although silicon dioxide is the preferred material for nonporous layer 22, it is recognized that other oxides compatible with the etching steps may be used as well as forming layer 22 from a p type polysilicon.

An alternate pressure actuated configuration of the microminiature valve is illustrated on FIG. 9. In the configuration, the substrate 12, including inlet and exit ports 14 and 16, spacer 20 and flexible diaphragm 22 are fabricated as discussed relative to FIGS. 4 through 8. Above nonporous layer 22 there is attached a cup shaped housing 40 having a signal input port 44. Housing 40 defines an internal chamber 42 enclosed on one side by the central portion of layer 22. The cup shaped housing 40 may be bonded to the top of the layer 22 or the substrate 12 using any of the standard techniques known in the art.

The operation of the pressure actuated configuration of the microminiature valve is straightforward. The opening and closing of the valve is controlled by the pressure P2 at the signal input port. When the pressure P2 is less than the pressure P1 of the fluid received at the inlet port 14, central portion of layer 22 deflects upward away from the valve seat 18 providing a fluid flow path between the inlet port 14 and outlet port 16. However when the pressure P2 applied to the signal input port 44 exceeds the pressure P1 applied to the inlet port 14 by an amount sufficient to deflect the central portion of layer 22 downwardly to engage the valve seat 18, the fluid flow path between the inlet port 14 and outlet port is occluded by the nonporous layer 22 closing the valve.

As will be appreciated by those skilled in the art, the disclosed microminiature valve is not limited to the configuration shown in the drawing or the materials and processes discussed in the specification. It is recognized that inlet port and valve seat may be offset with respect to the center of the enclosed volume 24, that the outlet port may also have a valve seat corresponding to valve seat 18, and that different materials for the substrate 12, spacer 20 and flexible diaphragm 22 may be substituted for the materials discussed in the Specification without departing from the spirit of the invention.

I claim:

1. A microminiature valve comprising:
   a semiconductor substrate having an inlet aperture for receiving a pressurized fluid, an outlet aperture and a raised valve seat protruding from the top surface of said substrate and circumscribing said inlet aperture;
   an integral semiconductor intermedate layer grown on the top surface of said substrate having a thickness greater than the height of said raised valve seat, said intermediate layer having a preferentially etched away central portion and circumscribing said inlet and outlet apertures;
   a semiconductor oxide flexible diaphragm integrally grown on said intermediate layer and peripherally supported therefrom, the unsupported portion of said flexible diaphragm in cooperation with said substrate and said intermediate layer forming an enclosed chamber connecting said inlet and outlet apertures; and
   a metal electrode provided in the external surface of said flexible diaphragm for receiving an electrical charge to electrostatically deflect said flexible diaphragm to engage said valve seat.

2. The microminiature valve of claim 1 wherein said flexible diaphragm is approximately 10 micrometers thick.

3. The microminiature valve of claim 1 wherein said semiconductor substrate is a p type silicon substrate, said intermediate layer is an n+ type silicon layer grown on the surface of said p type substrate and said flexible diaphragm is a silicon dioxide layer approximately 10 micrometers thick.

4. A microminiature valve having an integral multilayer structure comprising:
- a p type silicon substrate having an inlet port and an outlet port provided therethrough and a raised valve seat circumscribing said inlet port;
- an intermediate n type silicon layer grown on a substrate surface, said intermediate layer forming an annular spacer circumscribing said inlet and outlet ports;
- a silicon dioxide layer grown on said intermediate layer to form a flexible diaphragm enclosing the volume defined by said substrate and said annular spacer; and
- a metal electrode diposed on the external surface of said flexible diaphragm for receiving an electrical potential to electrostatically deflect said flexible diaphragm to engage said valve seat.

5. The microminiature valve of claim 4 wherein the height of said intermediate layer is greater than the height of said raised valve seat.

6. The microminiature valve of claim 5 wherein said flexible diaphragm is approximately 10 micrometers thick.

* * * * *